Feb. 5, 1957    J. D. FREEMAN    2,780,230
PNEUMATIC CONTROL APPARATUS WITH FOLLOW-UP
Filed Aug. 10, 1953
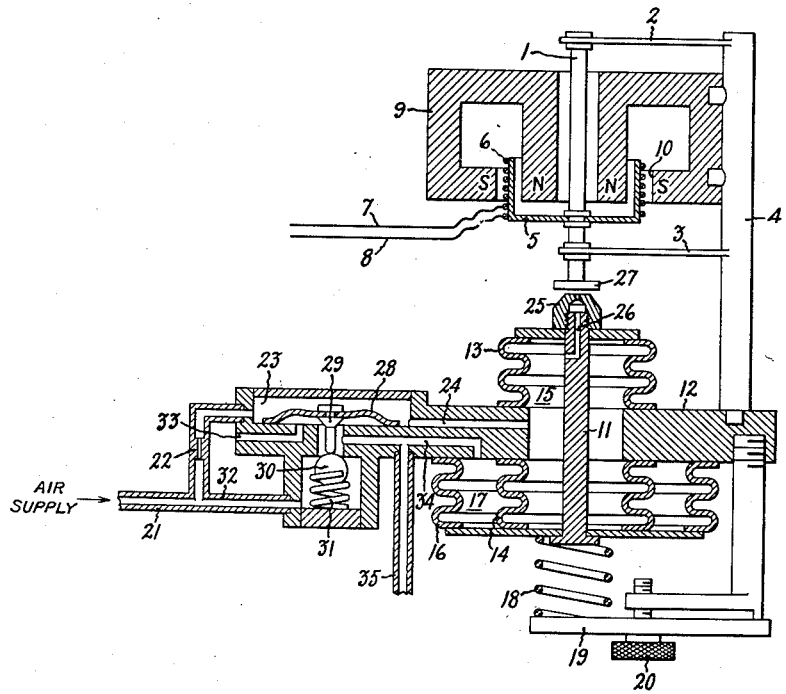
Inventor:
John D. Freeman,
by *[signature]*
His Attorney.

United States Patent Office 2,780,230
Patented Feb. 5, 1957

2,780,230

PNEUMATIC CONTROL APPARATUS WITH FOLLOW-UP

John D. Freeman, New York, N. Y., assignor to General Electric Company, a corporation of New York Application August 10, 1953, Serial No. 373,424

5 Claims. (Cl. 137—85)

My invention relates to pneumatic control apparatus for automatically adjusting the value of a pneumatic pressure in accordance with values of a variable electric current.

In many industrial measurement and control systems, the control signal is a variable pneumatic pressure which may, for example, be continuously variable between 3 lbs. per sq. in. gage and 15 lbs. per sq. in gage. This pressure may control the operation of pneumatically actuated valves or other control apparatus. In other measurement and control systems, the signal is an electric current which may, for example, be continuously variable between 0 and 10 milliamperes. It is sometimes desirable to combine pneumatic and electrical apparatus in a single system. For example, it may be desired to operate a pneumatically actuated control valve in accordance with values of a variable electric current provided by electrical measurement apparatus. In such cases, a transducer is needed to convert electric current values into corresponding pneumatic pressure values.

A principal object of my invention is to provide an improved transducer for converting electric current values into corresponding pneumatic pressure values. Other objects and advantages will appear as the description proceeds.

Briefly stated, in accordance with one aspect of my invention, I provide a pneumatic waste valve having a nozzle and a baffle, each movable independently of the other. Means are provided for adjusting the baffle position in accordance with electric current values, and other means are provided for adjusting the nozzle position in accordance with pneumatic pressure values. The spacing between the nozzle and the baffle controls a flow of air, and pneumatic relay means responsive to small changes in this flow controls the pneumatic pressure to keep the spacing between nozzle and baffle substantially constant. In this way the pneumatic pressure values are accurately controlled in accordance with the electric current values.

My invention will be better understood from the following description taken in connection with the accompanying drawing, and its scope will be pointed out in the appended claims.

In the drawing, the single figure is a partly schematic vertical section illustrating a preferred embodiment of my invention.

Referring now to the drawing, a shaft 1 is resiliently supported by a pair of leaf springs 2 and 3 attached to any suitable supporting means such as the post 4. Springs 2 and 3 bias shaft 1 to a neutral position, but upon application of a slight force, shaft 1 may be moved in the direction of its axis. Attached to shaft 1, as shown, and coaxial therewith, is a cup-shaped coil support 5. About the rim of support 5 is wound an annular coil 6 to which an electric current may be supplied through flexible leads 7 and 8. Attached to post 4 is a permanent magnet 9 having an annular air gap 10. Magnet 9 is magnetized, as indicated by letters N and S in the drawing, to provide magnetic flux across the air gap 10. The annular coil 6 is positioned within the air gap 10, as shown in the drawing, and is movable relative to the air gap with axial movement of shaft 1. When electric current is supplied to coil 6, the interaction of this current with the magnetic flux across the air gap provides a force which tends to move coil 6, coil support 5, and shaft 1 either up or down, selectively, depending upon the direction of the current. This movement is opposed by the resilience of springs 2 and 3. As a result, shaft 1 moves to a position at which the force provided by the current balances the force of the springs. Thus the position of shaft 1 is adjusted in accordance with the current values.

Another shaft 11, axially aligned with shaft 1, extends through an opening in a supporting plate 12, as shown. Two bellows 13 and 14, having equal diameters, are coaxial with shaft 11. The respective inner ends of bellows 13 and 14 are attached to supporting plate 12, while the respective outer ends of bellows 13 and 14 are attached to shaft 11, thus defining an air chamber 15. A larger diameter bellows 16 is coaxial with and surrounds bellows 14. The inner end of bellows 16 is attached to supporting plate 12, while the outer end of bellows 16 is attached to shaft 11, as shown, thus defining another air chamber 17. This bellows arrangement permits shaft 11 to move in the direction of its axis responsive to pressure changes within chamber 17. Pressure changes within chamber 15 have no substantial effect upon the position of shaft 11, since bellows 13 and 14 have equal diameters and exert substantially equal forces in opposite directions.

The force of air pressure within chamber 17 is balanced by a spring 18. The lower end of spring 18 engages a bracket 19 the position of which is preferably adjustable by adjustment screw 20 to adjust the tension of spring 18. Pressure in chamber 17 tends to move shaft 11 downwardly until the force exerted by this pressure is balanced by the resilient force of spring 18. Thus, the position of shaft 11 is automatically adjusted in accordance with the value of pneumatic pressure in chamber 17, which acts as a pneumatic motor.

Compressed air, preferably under a pressure of 17 to 20 lbs. per sq. in. gage, is supplied from any suitable supply through connection 21. A small amount of compressed air flows through restriction 22, air chamber 23 and passageway 24 to air chamber 15. Attached to the upper end of shaft 24 to air chamber 15. Attached to the upper end of shaft 11, and movable therewith, is a nozzle 25. A generally axial passageway 26 within shaft 11 connects nozzle 25 to air chamber 15, so that compressed air flows out of chamber 15 through passageway 26 and the tip of nozzle 25.

A baffle 27 is attached to and movable with, or formed as a part of, the lower end of shaft 1. Nozzle 25 and baffle 27 constitute a pneumatic waste valve in which the flow of air through the nozzle is regulated by the spacing between the nozzle and the baffle. Normally this spacing is in the order of a few mils.

It is evident that shaft 1 and shaft 11 are independently movable in the direction of their axis, and that movement of one shaft relative to the other varies the spacing between nozzle 25 and baffle 27. Since a relatively steady flow of air into chamber 15 is provided through restriction 22, while a variable flow of air out of the chamber through nozzle 25 is provided, the pneumatic pressure within chamber 15 is variable and is controlled by the spacing between nozzle 25 and baffle 27.

Since passageway 24 offers little restriction to the flow of air, the pressure within air chamber 23 is substantially the same as that within chamber 15. The pressure within chamber 23 acts upon a diaphragm 28 of a pneumatic relay valve, and pushes downward on a valve stem 29 connected to diaphragm 28. The lower end of valve stem 29 presses against a ball valve 30. A spring 31 presses upward against ball 30.

Compressed air from connection 21 passes through connection 32, over ball 30 to the space surrounding valve stem 29, under the conical portion at the upper end of stem 29 to the space beneath diaphragm 28, and then out to the atmosphere through passageway 33. The space surrounding valve stem 29 is connected to air chamber 17 through a passageway 34. When the pressure in chamber 23 increases, bellows 28 presses valve stem 29 and ball 30 downward, and permits more compressed air to pass over the top of ball 30, and less compressed air to pass under the conical upper portion of valve stem 29. This increases the air pressure in the space surrounding the valve stem, and consequently increases the pressure in the air chamber 17. Conversely, when the pressure in chamber 23 decreases, valve stem 29 and ball 30 move upward. This permits less air to pass over the top of ball 30, and more air to pass under the conical portion of stem 29, and thus reduces the pressure in the space surrounding the valve stem, and correspondingly reduces the pressure in air chamber 17.

Assume that the respective forces acting upon the various parts are all in equilibrium, and that baffle 27 then moves closer to nozzle 25. This reduces the flow of air through nozzle 25, and increases the pressure in air chambers 15 and 23. As the pressure in chamber 23 increases diaphragm 28 presses valve stem 29 and ball 30 downward, which allows more compressed air to flow into air chamber 17 and increases the pressure in this chamber. The increased pressure in chamber 17 moves shaft 11 downward, and moves nozzle 25 away from baffle 27 until the forces are again in equilibrium. Due to the pressure amplification provided by the pneumatic relay valve, a small change of pressure within air chamber 15, produced by a change in spacing between nozzle 25 and baffle 27 of about 1 mil or less, is sufficient to change the pressure within air chamber 17 over the full range of 3 lbs. per sq. in. gage to 15 lbs. per sq. in. gage. Thus the spacing between nozzle 25 and baffle 27 is kept substantially constant, and the pressure 17 is automatically controlled to adjust the position of shaft 11 in substantially exact correspondence with changes in the position of baffle 27.

When a "direct-action" conversion from electric current to pneumatic pressure is desired; that is, when it is desired that an increase in current produce an increase in pneumatic pressure, the apparatus may be adjusted as follows: With no current in coil 6, shaft 1 assumes a neutral position established by springs 2 and 3. Adjustment screw 20 is then manipulated to adjust the tension of spring 18 until an equilibrium pressure of 3 lbs. per sq. in. gage is obtained in chamber 17. The electric current signal is applied to leads 7 and 8 in such a direction that baffle 27 moves toward nozzle 25, against the bias of springs 2 and 3, a distance proportional to the value of the current. As hereinbefore explained, such movement of baffle 27 acts to increase the pressure in chamber 17 to maintain the spacing between the nozzle and baffle substantially constant. In this way, a pneumatic pressure having values which change in direct proportion to changes in the value of the electric current is provided.

When inverse action is desired; that is, when it is desired that an increasing electric current produce a decreasing pneumatic pressure, the tension of spring 18 is readjusted until an equilibrium pressure of 15 lbs. per sq. in. is provided in chamber 17 when no current is supplied to coil 6. The signal current is then applied to leads 7 and 8 in such direction that the current moves shaft 1 upward, against the resilience of springs 2 and 3, a distance proportional to the value of the electric current. Upon such upward movement of baffle 27, the pressure in chamber 17 is automatically reduced to move shaft 11 upward and keep the spacing between the baffle and the nozzle substantially constant. This provides a pneumatic pressure having values which change by amounts inversely proportional to changes in value of the electric current.

In some cases, the electric current signal may have both positive and negative values, selectively. For example, the current may vary between minus 5 milliamperes and plus 5 milliamperes. In such cases, screw 20 may be adjusted to provide an equilibrium pressure of 9 lbs. per sq. in. gage, for example, in chamber 17 with 0 current in coil 6. Currents of one polarity then move baffle 27 downward and increase the pressure in chamber 17, while currents of the other polarity move baffle 27 upward and decrease the pressure in chamber 17.

In order that the pressure in chamber 17 may be used to control pneumatically actuated valves or other control apparatus, an output connection 35 is connected to passageway 34. The other end of connection 35 is connected to the valve or other apparatus to be controlled, which is not shown in the drawing.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. Pneumatic control apparatus comprising a supporting member having an opening therein, an axially movable shaft extending through said opening, a pair of bellows having equal diameters and being each coaxial with said shaft, said pair of bellows having respective inner ends attached to said supporting member and respective outer ends attached to and movable with said shaft, thus defining a first air chamber, a larger-diameter bellows coaxial with said shaft and surrounding one of said pair of bellows, said larger diameter bellows having an end attached to said supporting member and another end attached to and movable with said shaft, thus defining a second air chamber, means providing a flow of air into said first chamber, a nozzle at one end of said shaft, said shaft having a passageway connecting said nozzle to said first chamber, whereby air escapes from said first chamber through said nozzle, a baffle adjacent to said nozzle and independently movable along the direction of the shaft axis, whereby a first pneumatic pressure is provided within said first chamber the value of which is controlled by the spacing between said nozzle and said baffle, means providing a second pneumatic pressure within said second chamber, thereby expanding said larger diameter bellows and adjusting the position of said nozzle, and pneumatic relay means controlling the value of said second pressure in accordance with the value of said first pressure, whereby the value of said second pressure is controlled by the position of said baffle.

2. Pneumatic control apparatus comprising a supporting member having an opening therein, an axially movable shaft extending through said opening, a pair of bellows having equal diameters and being each coaxial with said shaft, said pair of bellows having respective inner ends attached to said supporting member and respective outer ends attached to and movable with said shaft, thus defining a first air chamber, a larger-diameter bellows coaxial with said shaft and surrounding one of said pair of bellows, said larger-diameter bellows having an end attached to said supporting member and another end attached to and movable with said shaft, thus defining a second air chamber, means providing a flow of air into said first chamber, a nozzle at one end of said shaft, said shaft having a passageway connecting said nozzle to said first chamber, whereby air escapes from said first chamber through said nozzle, a baffle adjacent to said nozzle and independently movable along the direction of the shaft axis, whereby a first pneumatic pressure is provided within said first chamber, the value of which is controlled by the spacing between said nozzle and said baffle, means providing a second pneumatic pressure within said second chamber, thereby expanding said larger diameter bellows and adjusting the position of said nozzle, pneumatic relay means controlling the value of said second pressure in accordance with the value of said first pressure, whereby the value of said second pressure is controlled by the position of said baffle, a resilient member having one of its ends coacting with said larger bellows to exert a biasing force thereon in opposition to the force expanding said larger bellows, and means for adjusting the magnitude of said biasing force.

3. The combination defined by claim 2 wherein said baffle is coupled to electromagnetic means and is moved thereby along the direction of the shaft axis in accordance with values of a variable electric current, there being spring means biasing said baffle in opposition to said electromagnet.

4. The combination defined by claim 3 wherein said electromagnetic means moves said baffle toward said nozzle in accordance with increasing values of a variable electric current and said biasing force opposing the expansion of said larger bellows is adjusted to correspond to the minimum value of said second pneumatic pressure.

5. The combination defined by claim 3 wherein said electronic means moves said baffle away from said nozzle in accordance with increasing values of a variable electric current and said biasing force opposing the expansion of said larger bellows is adjusted to correspond to the maximum value of said second pneumatic pressure.

References Cited in the file of this patent

UNITED STATES PATENTS

| | | |
|---|---|---|
| 1,917,092 | Bristol | July 4, 1933 |
| 2,268,783 | Tate | Jan. 6, 1942 |
| 2,310,298 | Kuhl | Feb. 9, 1943 |
| 2,312,201 | Thompson | Feb. 23, 1943 |
| 2,427,235 | Smoot | Sept. 9, 1947 |
| 2,443,891 | Buerschaper | June 22, 1948 |
| 2,461,026 | Bilyeu | Feb. 8, 1949 |
| 2,520,468 | Moore | Aug. 29, 1950 |
| 2,601,867 | Alyea | July 1, 1952 |
| 2,638,874 | Woodhull | May 19, 1953 |
| 2,718,896 | Jones | Sept. 27, 1955 |